(12) United States Patent
Koehler et al.

(10) Patent No.: US 7,865,327 B2
(45) Date of Patent: Jan. 4, 2011

(54) METHOD FOR DETERMINING THE TEMPERATURE OF AN ELECTRICAL COMPONENT WITH THE AID OF A TEMPERATURE MODEL

(75) Inventors: Ingo Koehler, Ludwigsburg (DE); Olaf Grotheer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 12/286,709

(22) Filed: Sep. 30, 2008

(65) Prior Publication Data

US 2010/0030510 A1 Feb. 4, 2010

(30) Foreign Application Priority Data

Aug. 4, 2008 (DE) ................. 10 2008 040 968

(51) Int. Cl.
*G01K 7/16* (2006.01)

(52) U.S. Cl. ...................................... 702/133

(58) Field of Classification Search ................. 702/133; 701/103; 324/207.16; 188/267.2; 62/151; 318/139

See application file for complete search history.

(56) References Cited

U.S. PATENT DOCUMENTS

| 5,788,028 | A  | * | 8/1998  | Bieber .................. 188/266.6 |
| 6,986,413 | B2 | * | 1/2006  | Fedders et al. ........... 188/267.2 |
| 2003/0097849 | A1 | * | 5/2003  | Taguchi ..................... 62/133 |
| 2006/0230770 | A1 | * | 10/2006 | Kitsch ........................ 62/151 |
| 2009/0265066 | A1 | * | 10/2009 | Ogawa et al. ................. 701/55 |

FOREIGN PATENT DOCUMENTS

DE  10 2006 041 193  3/2008

* cited by examiner

*Primary Examiner*—Bryan Bui
(74) *Attorney, Agent, or Firm*—Kenyon & Kenyon LLP

(57) ABSTRACT

A method for determining the temperature or the ohmic resistance of an electrical component, especially of a coil of a magnetic valve. The component temperature is estimated with the aid of a temperature model, which is able to determine the curve of the component temperature even during a control of the valve. The temperature model is corrected regularly based on the measured value, in this context.

20 Claims, 2 Drawing Sheets

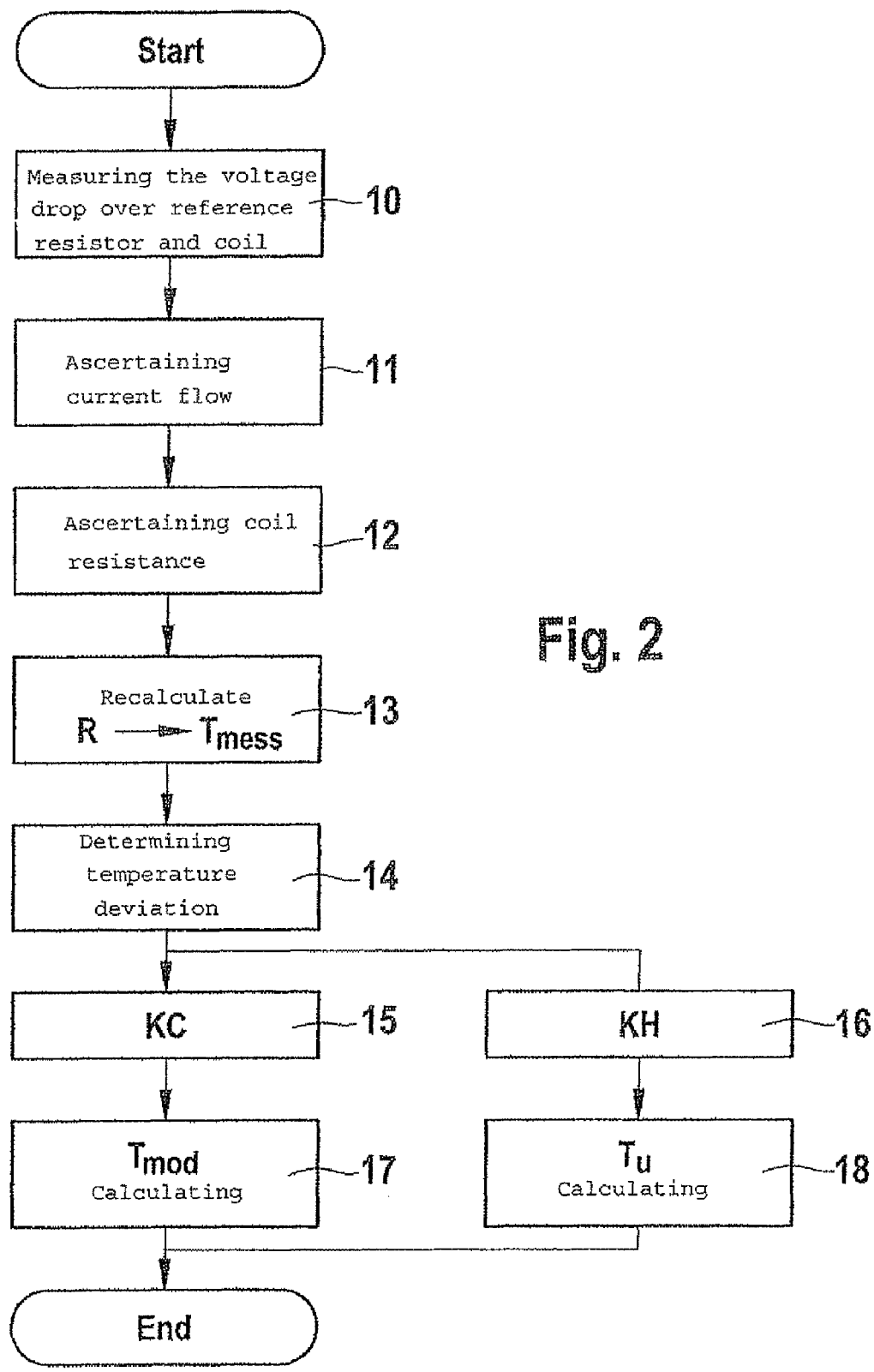

METHOD FOR DETERMINING THE TEMPERATURE OF AN ELECTRICAL COMPONENT WITH THE AID OF A TEMPERATURE MODEL

FIELD OF THE INVENTION

The present invention relates to a method for determining the temperature or the resistance of an electrical component, as well as a control unit having a temperature model.

BACKGROUND INFORMATION

Magnetic valves, as used, for example, in the brake circuit of motor vehicles, include a coil for generating a magnetic field by which an armature is actuated. The magnitude of the current flow determines the strength of the magnetic field, in this instance, and with that the setting of the valve (open, closed or intermediate setting). The current flow through the coil is usually set by a valve output stage which includes essentially an output stage switch (MOSFET), which is controlled by drive electronics. The control of the output stage switch takes place mostly by a PWM signal (PWM: pulse width modulation).

During the control of a magnetic valve, for instance, within the scope of an ESP regulation, a heat loss is generated which leads to the heating of the magnetic valve. This raises the ohmic resistance of the valve. Conversely, the magnetic valve cools off when at rest, whereby the resistance goes down as well. Consequently, in a vehicle regulation the problem arises that one and the same PWM signal leads to different valve conditions at various valve temperatures. This impairs the accuracy of the control interventions.

In order to eliminate this problem, it is known, for example, from German Patent No. DE 10 2006 041 193 that one may determine the resistance of a magnetic coil directly via a voltage measurement and readjust the control signal (PWM) of the magnetic valve correspondingly.

However, a resistance measurement is possible only at those times at which the corresponding valve is not being controlled. By contrast, during the control of the valve, the valve temperature and its resistance are not able to be determined.

SUMMARY OF THE INVENTION

It is therefore an object of the present invention to provide a method and a device by the use of which the ohmic resistance of the electrical component is able to be determined even during a control phase of the valve.

One important aspect of the present invention is to estimate the temperature development of the electrical component with the aid of a model which reflects the thermophysical processes in the electrical component. To improve the accuracy of the temperature model, it is provided that one measure the temperature of the electrical component (or of a system included in the component) at certain times directly or indirectly, and to correct the temperature model, based on the measured value(s). This correction preferably also takes into account at least one parameter (KC, KH), which is a function of a temperature deviation (swing), namely the difference between a model-based estimated component temperature and the environmental temperature. This has the substantial advantage that the temperature or the resistance of the magnetic coil is able to be determined accurately even during the control of the valve.

The component temperature is preferably determined indirectly via the resistance of the component, that is, the resistance value is simply recalculated to give the temperature. The resistance, in turn, is determined from a voltage drop at the component or rather, at a device including the component (also indirectly). Because of the unique relationships between the variables named, they may simply be recalculated into another one. The terms "temperature", "resistance" and "voltage" should therefore be understood to be synonymous. For the sake of simplicity, only the term temperature is used in the following.

The parameter (KC, KH) is preferably read off from a characteristics curve as a function of the temperature deviation. The characteristics curve may be generated, for example, in an offline simulation, with the aid of a Kalman filter. The characteristics curve simulates the essential properties of a genuine Kalman filter, and particularly has the advantage that the reading out of a parameter requires substantially less calculating power than a genuine Kalman filter. Parameters KC, KH are filter parameters of the Kalman filter, in this case.

According to the present invention, the component temperature is measured at certain times, for instance, every 20 s (preferably indirectly via a resistance measurement). Between these points in time, the component temperature is preferably estimated with the aid of a temperature model.

According to one preferred specific embodiment of the present invention, if a measured value of the component temperature is present, the temperature model is corrected as follows:

$$T_{mod}:=T_{mod-1}+KC\cdot(T_{mess}-T_{mod})$$

where $T_{mess}$ is the measured component temperature and KC is a parameter read out from the characteristics curve. To the left of the equals sign, the new value $T_{mod}$ is given, and to the right the old value $T_{mod-1}$ is given. The characteristics curve is preferably a function of the temperature deviation, that is, the difference between the model-based component temperature $T_{mod}$ and an environmental temperature $T_U$.

The environmental temperature $T_U$ is preferably also estimated with the aid of the temperature model, but could also be measured. In the first case, a temperature model is provided for the environmental temperature. This model is preferably also corrected based on the measured value(s). In this context, a further parameter (KH) is taken into account which is read out from a characteristics curve that is a function of the temperature deviation.

According to one preferred specific embodiment of the present invention, the environmental temperature is corrected as follows:

$$T_U:=T_{U-1}+KH\cdot\mathrm{Sum}(T_{mess}-T_{mod}).$$

In this context, $T_{mess}$ is the (directly or indirectly) measured component temperature and KH is a parameter. To the left of the equals sign, the new value $T_U$ is given, and to the right the old value $T_{U-1}$ is given.

The algorithms described above are preferably filed in a control unit.

BRIEF DESCRIPTION OF THE DRAWINGS

FIG. 2 shows the important method steps of a method for determining the resistance of a magnetic coil with the aid of a temperature model.

DETAILED DESCRIPTION

Figure 1:
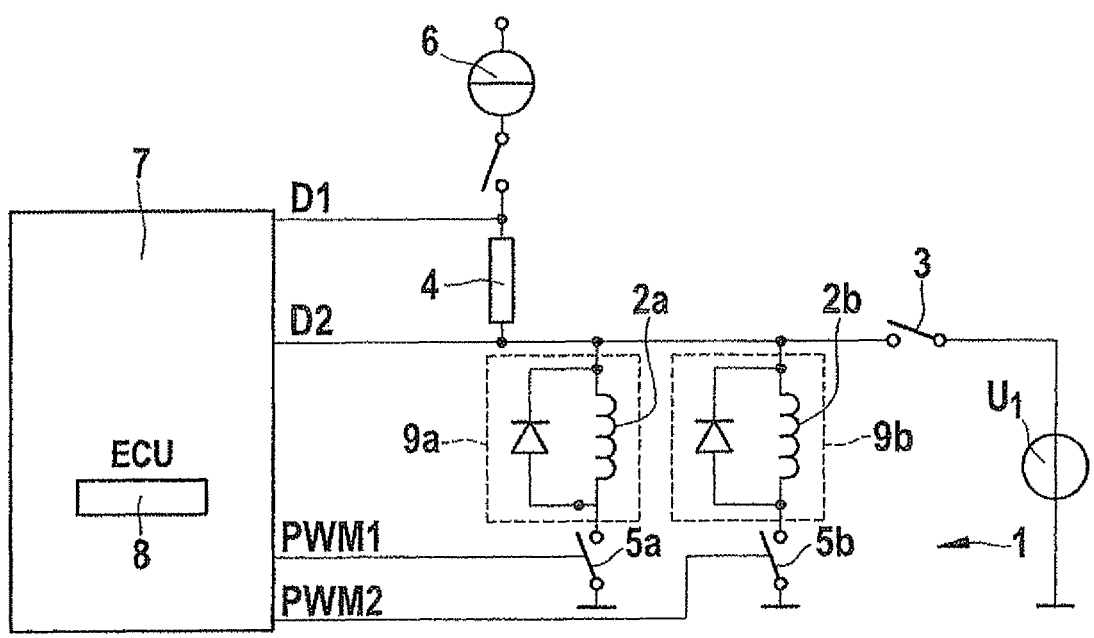
FIG. 1 shows a circuit for determining the ohmic resistance of a coil of a magnetic valve.

FIG. 1 shows a schematic circuit diagram of a valve output stage 1 for two current-controlled valves 9a, 9b, such as ones installed in known passenger car braking systems, for example. Of the valves 9a, 9b, only the appertaining coils 2a and 2b are shown here. The two coils 2a, 2b, connected in parallel are connected to a supply voltage $U_1$ via a common main switch 3. Switch 3 is durably closed in normal operation, and may be opened in case of a fault at one of valves 2a, 2b, or in case of a resistance measurement of the valve resistances. In the first case, switch 3 is used essentially as a safety switch.

Each one of valves 9a, 9b includes an associated output stage switch 5a, 5b, which is controlled by a drive electronics (control unit 7). In normal operation, output stage switches 5a, 5b are controlled using a PWM signal PWM1, PWM2, whose pulse duty factor determines the current flow through coils 2a, 2b, and thus determines the setting of the associated valve.

Since the ohmic resistance of coils 2a, 2b is temperature-dependent, one and the same PWM signal leads to different valve states in the case of different valve temperatures. With the aid of a temperature determination of valves 9a, 9b it is possible to readjust PWM signals PWM1, PWM2.

The valve temperature is measured indirectly via a resistance measurement, in this instance. For this purpose, the voltage dropping off to ground is measured at a supply side node D2 of coils 2a, 2b and from this the coil resistance is calculated, knowing the current that is flowing through coils 2a, 2b. The coil resistance, in turn, is able to be recalculated to a temperature, in a simple manner.

The resistance measuring device includes a current source 6 and a reference resistor 4, which is connected in series to coils 2a, 2b. The resistance measurement may be carried out only outside of control of output stage switches 5a, 5b, for otherwise it would interfere with the operation of valves 9a, 9b. During measurement operation, main switch 3 is opened, so that coils 2a, 2b are then supplied exclusively by current source 6. As desired, by the appropriate control of output stage switches 5a, 5b, voltage $U_{mess}$ may now be measured via coils 2a and output stage switch 5a, via coils 2b and output stage switches 5b, or the voltage drop may be measured via the entire parallel device 2a, 2b, 5a, 5b. Measured voltage $U_{mess}$ is a measure for the resistance of the respective measuring path, in this instance.

In order to check first valve 9a, for instance, the associated first output stage switch 5a is closed (and the other output stage switch 5b is opened). Current I injected by D.C. source 6 flows, in this instance, via reference resistor 4, measuring node D2 through coils 2a and output stage switch 5a to ground. In this context, the voltage dropping off at node D2 is measured. In order to check second valve 9b, associated output stage switch 5b is closed (and switch 5a is opened). Current I injected by direct current source 6 in this case flows via reference resistor 4 through second coil 2b and output stage switch 5b towards ground. In this context, in turn, voltage $U_{mess}$ dropping off at node D2 is measured. Optionally, both output stage switches 5a, 5b could also be closed, in order to check both valves 9a, 9b in parallel at the same time. During this measuring phase, switch 3 remains open.

In order to determine the coil resistance of coils 2a, 2b, the steps shown in FIG. 2, blocks 10 to 12 are carried out. According to block 10, first of all, the voltage dropping off over one of coils 2a, 2b and also over reference resistor 4 is measured.

If the reference resistor is a resistor having very low tolerances, current I supplied by current source 6 is able to be determined very accurately with the aid of the voltage measurement. This calculation of current I takes place in block 11, FIG. 2. From the voltage dropping off at node 2 and current value I determined before, the resistance of coils 2a or 2b may now be very accurately determined in step 12. Control signal PWM and PWM2 of output stage switches 5a, 5b may consequently be readjusted appropriately.

The temperature measurement or the resistance measurement of coils 2a, 2b is able to be determined only outside the control phases, as was mentioned above. In order also to be able to ascertain the coil resistance during the control phases, a mathematical temperature model 8 is provided in this instance, that is integrated into control unit 7. Temperature model 8 reflects the thermophysical properties of coils 2a, 2b and includes appropriate mathematical algorithms. In order to improve the accuracy of temperature model 8, it is regularly corrected based on temperature measured values. This correction of temperature model 8 will be explained below, in light of blocks 13 to 18.

In step 13, if there is a new resistance measured value, this resistance measured value is recalculated to a corresponding coil temperature $T_{mess}$. For the corrected temperature $T_{mod}$, the following applies, for example:

$$T_{mod} := T_{mod-1} + KC \cdot (T_{mess} - T_{mod}).$$

In this equation, KC is a value read out from the characteristics curve that is a function of its temperature deviation. The temperature deviation is the difference obtained from a model-based calculated coil temperature and a model-based calculated environmental temperature. The characteristics curve mentioned may be generated, for example, in an offline simulation, with the aid of a Kalman filter. Thus, it simulates the properties of a genuine Kalman filter.

In order to determine the new, updated coil temperature $T_{mod}$, in step 14 the temperature deviation is first determined, and in step 15, parameter KC is read out from the characteristics curve. Finally, in step 17, updated temperature value $T_{mod}$ is calculated according to the above equation, where $T_{mod-1}$ is the current coil temperature. Temperature model 8 may now be adjusted to the new value $T_{mod}$.

Temperature model 8 preferably also includes a model which models the environmental temperature of valves 9a, 9b, and in particular calculates the temperature of a heat sink into which the valves are press-fit. This second temperature model, too, is preferably calibrated from time to time to a reference value. The reference value is preferably also calculated based on measured component temperature $T_{mess}$ (step 18). For example, the following correction may be carried out:

$$T_U := T_{U-1} + KH \cdot \text{Sum}(T_{mess} - T_{mod}).$$

In step 15, parameter KH is read out from a characteristics curve that is a function of the temperature deviation. The KH characteristics curve is preferably also obtained from a simulation having a genuine Kalman filter. Temperature model 8 may now be adjusted to the new value $T_U$.

Steps 15, 17 and 16, 18 may optionally also be carried out sequentially.

What is claimed is:
1. A method for determining a temperature or a resistance of an electrical component, the method comprising:
    measuring, with an electronic processor, a temperature of the electrical component or a corresponding value at predetermined points in time; and calculating, with the electronic-processor, the temperature of the electrical component or the corresponding value between the predetermined points in time based in part on a temperature model.

2. The method according to claim 1, wherein the electrical component is a coil of a magnetic valve.

3. The method according to claim 1, further comprising:
correcting the temperature model based on a measured value.

4. The method according to claim 3, wherein the correction takes into account a parameter, which is a function of a temperature deviation, including a difference between a model-based estimated component temperature and an environmental temperature.

5. The method according to claim 4, further comprising;
determining the parameter as a function of the temperature deviation, with a characteristics curve.

6. The method according to claim 4, further comprising:
estimating the environmental temperature with the temperature model.

7. The method according to claim 1, wherein the method is performed iteratively, further comprising:
correcting the temperature model based on the measured value, wherein the correcting includes redefining the temperature model used in a current iteration as a function of the temperature module used in a previous iteration plus a temperature deviation characteristic parameter applied to the difference of the measured temperature and the calculated temperature based on the model.

8. The method according to claim 1, wherein the temperature model estimates an environmental temperature, taking into account a parameter, which is a function of a temperature deviation.

9. The method according to claim 8, wherein the parameter is read out from a characteristics curve as a function of the temperature deviation.

10. A control unit for determining a temperature or a resistance of an electrical component, comprising:
a measuring arrangement for measuring a temperature of the component or a corresponding value at predetermined points in time; and
an electronic processor for calculating the temperature of the component or the corresponding value between the predetermined points in time based in part on a temperature model.

11. The control unit according to claim 10, wherein the component is a coil of a magnetic valve.

12. The control unit according to claim 10, further comprising:
a storing arrangement to store at least one characteristics curve, from which a parameter is read out as a function of a temperature deviation.

13. An electronic-processor-executable method for determining a temperature of an electronic component having a temperature dependent resistance affecting operation of the electronic component, comprising:
for a plurality of iterations, iteratively calculating, with the electronic processor, an estimate of the temperature of the electronic component as a function of a model that describes the thermophysical processes of the electronic component;
measuring a value for the temperature of the electronic component at predetermined points in time; and
adjusting the model based on the value measured.

14. The method of claim 13, wherein determining a temperature is done directly based on temperature or indirectly based on one of: a resistance of the electronic component and a voltage of the electronic component.

15. The method of claim 13, wherein the measuring is performed only when the electrical component is not being controlled.

16. The method of claim 13, wherein the adjusting the model is further based on a characteristics curve as a function of a temperature deviation.

17. The method of claim 16, wherein the temperature deviation is a difference between the estimate and an environmental temperature.

18. The method of claim 13, wherein the measuring and the adjusting are also performed iteratively, and the calculating is performed with a greater frequency than the measuring and adjusting.

19. The method of claim 13, wherein the adjusting includes adjusting the model as a function of a previous model which is the model from a previous iteration and a difference between the value measured and a value determined by the previous model.

20. The method of claim 19, wherein the difference is modified based on a characteristics curve as a function of a temperature deviation.

* * * * *